United States Patent
Kozar et al.

(10) Patent No.: US 8,609,219 B2
(45) Date of Patent: Dec. 17, 2013

(54) SELECTIVELY COUPLED FIBERS IN COMPOSITES

(75) Inventors: Michael P. Kozar, Mercer Island, WA (US); Mark S. Wilenski, Mercer Island, WA (US); Daniel C. Stanley, Renton, WA (US)

(73) Assignee: The Boeing Company, Chicago, IL (US)

( * ) Notice: Subject to any disclaimer, the term of this patent is extended or adjusted under 35 U.S.C. 154(b) by 420 days.

(21) Appl. No.: 12/968,575

(22) Filed: Dec. 15, 2010

(65) Prior Publication Data

US 2012/0156422 A1    Jun. 21, 2012

(51) Int. Cl.
  *B32B 5/12* (2006.01)
  *B32B 37/00* (2006.01)
  *B32B 27/00* (2006.01)

(52) U.S. Cl.
  USPC ......... 428/113; 29/419.1; 156/60; 156/308.2; 428/98; 428/99; 428/105

(58) Field of Classification Search
  USPC ........ 428/113, 105, 98, 99; 29/419.1; 156/60, 156/308.2
  See application file for complete search history.

(56) References Cited

U.S. PATENT DOCUMENTS

| 4,320,160 A | 3/1982 | Nishimura et al. |
| 5,665,450 A | 9/1997 | Day et al. |
| 2005/0197025 A1 | 9/2005 | Hallam |
| 2008/0241537 A1 | 10/2008 | Sennett |

FOREIGN PATENT DOCUMENTS

| EP | 0144939 | 6/1985 |
| EP | 1348791 | 10/2003 |
| WO | WO2007041782 | 4/2007 |
| WO | WO2007080113 | 7/2007 |

OTHER PUBLICATIONS

U.S. Appl. No. 12/901,342, "Transparent Composites With Organic Fiber" by Michael Kozar et al. and filed Oct. 8, 2010.
International Search Report, PCT/US2011/060248, dated Mar. 30, 2102.

*Primary Examiner* — Brent O'Hern

(57) ABSTRACT

A composite article may include a plurality of fibers embedded within a matrix. The fibers may include a first fiber and a second fiber which may be oriented in substantially parallel relation to one another. The first and second fibers may be connected to one another at one or more connection sites.

23 Claims, 11 Drawing Sheets

SELECTIVELY COUPLED FIBERS IN COMPOSITES

CROSS-REFERENCE TO RELATED APPLICATIONS

This application is related to co-filed application Ser. No. 12/968,514 entitled CONTROLLED FIBER-MATRIX ADHESION FOR POLYMER FIBER COMPOSITES and filed on Dec. 15, 2010. This application is also related to co-filed application Ser. No. 12/968,535 entitled FIBERS WITH INTERLOCKING SHAPES and filed on Dec. 15, 2010. This application is additionally related to co-filed application Ser. No. 12/968,557 entitled OPTIMIZED FIBER SHAPES FOR IMPROVED OPTICAL PERFORMANCE and filed on Dec. 15, 2010. The entire contents of the above-mentioned applications are expressly incorporated by reference herein.

FIELD

The present disclosure relates generally to composites and, more particularly, to fiber reinforced composite articles having improved ballistic performance.

BACKGROUND

Composite structures typically comprise a matrix reinforced with fibers wherein the fibers are embedded in the matrix. Composite structures are designed to transmit loads along the length of the fibers. Loads from one fiber may be transferred to another fiber in the same layer or to fibers in an adjacent layer by passing through the matrix material. However, the matrix is typically weaker than the fibers such that when a sufficiently high load is transmitted from one fiber to another fiber across the matrix, the matrix will fail. The failure of the matrix allows the fibers to move laterally within the composite structure.

During a ballistic event where a composite panel may be impacted by a projectile, the ability of the fibers to move laterally or sideways is generally detrimental to the overall ballistic performance of the composite panel. For example, the ability of the fibers in the matrix to move laterally allows the projectile to wedge between the fibers. The wedging of the projectile between the fibers allows the projectile to penetrate the thickness of a composite panel without fracturing the fibers. In this regard, lateral movement of the fibers and subsequent wedging of a projectile reduces the ballistic performance capabilities of the panel.

As can be seen, there exists a need in the art for a composite structure that provides reduced susceptibility to lateral movement of the fibers such that ballistic performance may be improved.

BRIEF SUMMARY

The above-described needs associated with composite structures for ballistic applications are specifically addressed and alleviated by the present disclosure which, in an embodiment, provides a composite article having a plurality of fibers embedded within a matrix. The fibers may include a first fiber and a second fiber which may be oriented in substantially parallel relation to one another. The first and second fibers may be connected to one another at one or more discrete connection sites.

In a further embodiment, disclosed is a composite article having a plurality of fibers embedded within a matrix. The fibers may include a first fiber and a second fiber which may be oriented in a substantially parallel relation to one another. The first and second fibers may be arranged in a first plane and may be connected to one another at a plurality of discrete connection sites.

Additionally disclosed is a method of manufacturing a composite article which may include the steps of arranging a plurality of fibers in substantially parallel relation to one another. The plurality of fibers may include first and second fibers. The method may further include connecting the first fiber to the second fiber at least one connection site. The method may further include embedding the plurality of fibers within a matrix.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numerals refer to like parts throughout and wherein.

DETAILED DESCRIPTION

Figure 1:
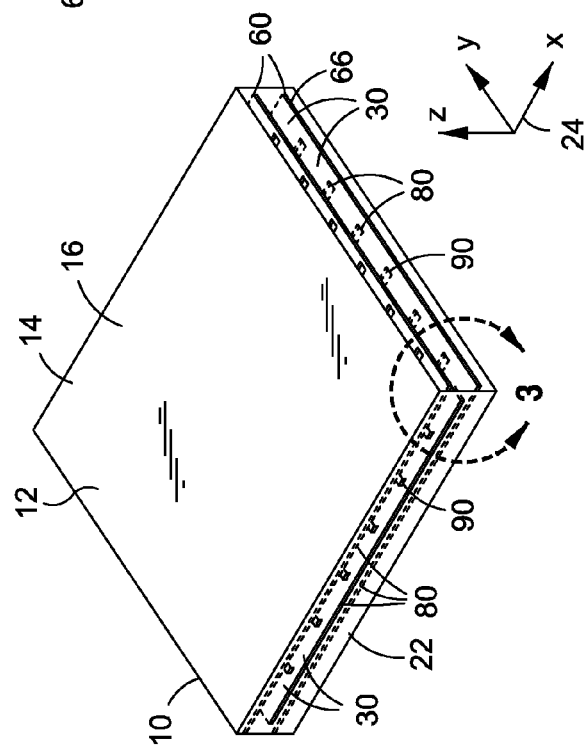
FIG. 1 is a perspective illustration of a composite article in an embodiment comprising a matrix and a plurality of fibers.

Referring now to the drawings wherein the showings are for purposes of illustrating preferred and various embodiments of the disclosure, shown in FIG. 1 is an embodiment of a composite article 10. The composite article 10 may be fabricated as a fiber-reinforced composite panel 14 comprising a substantially transparent polymeric matrix 22 and a plurality of substantially transparent fibers 30 which may be embedded within the polymeric matrix 22. Although illustrated in FIG. 1 in a panel 14 configuration having panel surfaces 16, the composite article 10 may be provided in any one of a wide variety of sizes, shapes and configurations, without limitation, and may include planar and/or compound curvature surfaces.

Figure 2:
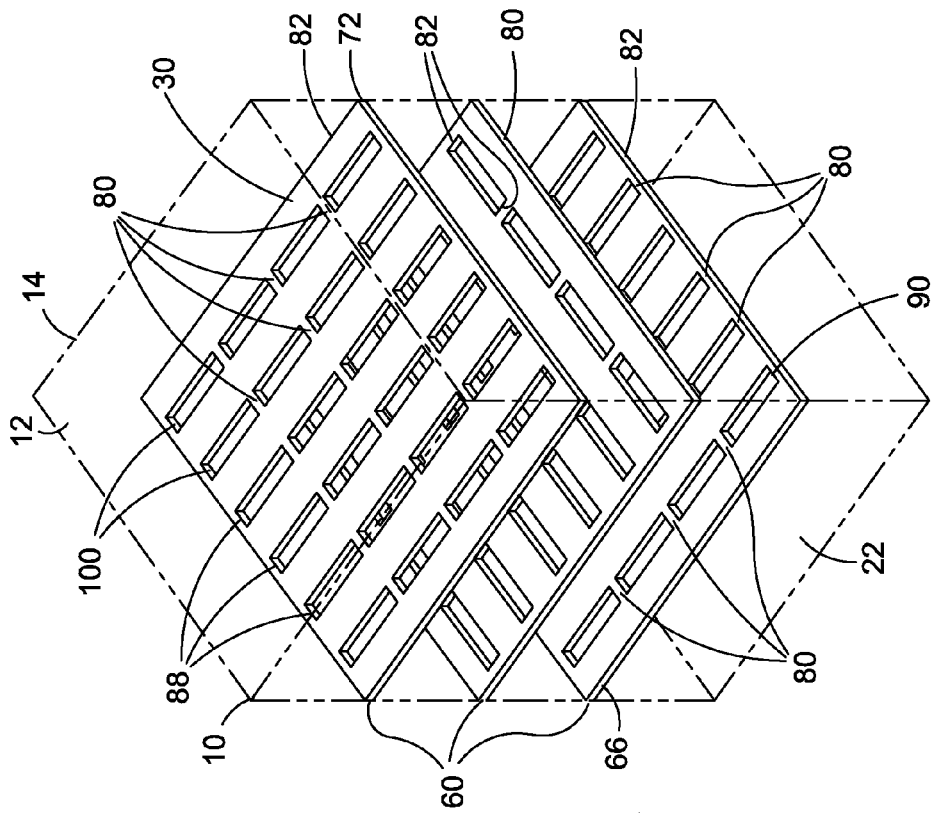
FIG. 2 is an exploded perspective illustration of the composite article of FIG. 1 and illustrating a plurality of layers of the fibers in an embodiment wherein the fibers are connected to one another at periodic intervals at discrete connection sites.

Referring to FIG. 2, shown is an exploded illustration of the panel 14 of FIG. 1 and illustrating a plurality of the fibers 30 which may be formed as elongated strips and arranged in layers 60. However, the fibers 30 may be provided in any size, shape and configuration and are not limited to elongated shapes. The fibers 30 may be oriented in substantially parallel relation to one another at any given layer 60 although non-parallel orientations of fiber 30 within a layer 60 are contemplated. Advantageously, the composite article 10 as disclosed herein provides for selective coupling of the fibers 30 to one another at one or more discrete connection sites 80 as illustrated in FIG. 2. For example, FIG. 2 illustrates three of the layers 60, each including a plurality of fibers 30 arranged substantially parallel to one another. The fibers 30 in each one of the layers 60 are connected to adjacent fibers 30 at a plurality of connection sites 80 which may be spaced at any desired interval along a length of one or more of the fibers 30. The coupling of the fibers 30 at one or more discrete connection sites 80 may force interaction and/or cooperation between adjacent and non-adjacent fibers 30 which may significantly alter load paths (e.g., the direction and/or length of the load paths) through the composite article 10 and may limit damage propagation through the composite article 10 such as may occur during a failure event such as a ballistic impact event. Furthermore, the addition of fiber 30 coupling at one or more discrete connection sites 80 may advantageously improve and/or control the mechanical properties of the composite article 10 including improving properties such as interlaminar shear strength, stiffness, compression strength, fracture toughness and damage tolerance of the composite article 10.

Although FIG. 2 illustrates in-plane coupling 82 of the fibers 30 in each layer 60, the present disclosure further contemplates out-of-plane coupling 84 of fibers 30 or combinations of in-plane coupling 82 and out-of-plane coupling 84 of the fibers 30 in any one of a variety of different arrangements as described below. The technical effect of the selective coupling of fibers 30 to one another is in an improvement of the composite article 10 in resisting penetration of a projectile through the composite article 10. More specifically, by coupling the fibers 30 to one another at selected connection sites 80 throughout the composite article 10, the ability of a projectile in wedging between the fibers 30 is reduced. Furthermore, the selective coupling of the fibers 30 to one another at one or more connection sites 80 throughout the composite article 10 provides a means for controlling the size or area of the composite article 10 that may be damaged as a result of impact by a projectile. In this regard, the selective coupling of the fibers 30 at one or more connection sites 80 throughout the composite article 10 provides a means for tuning or tailoring the stiffness of the composite article 10 for improving ballistic and/or structural performance.

Figure 3:
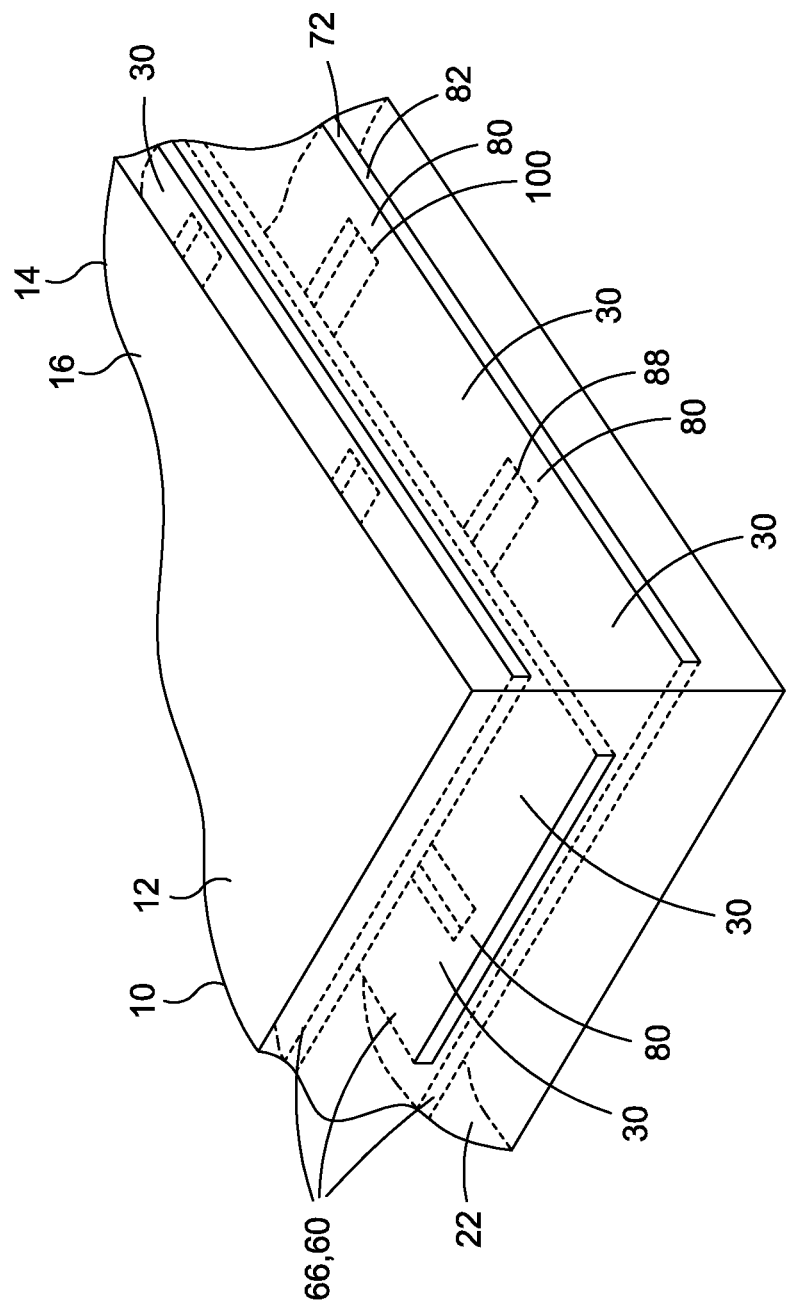
FIG. 3 is an enlarged perspective illustration of a portion of the composite article of FIG. 1 and illustrating an arrangement of the layers of fibers within the matrix and further illustrating in-plane coupling of the fibers of each layer.

Referring to FIG. 3, shown is an enlarged perspective illustration of the composite article 10 illustrating the fibers 30 arranged in layers 60 within the matrix 22. In FIG. 3, each one of the layers 60 includes fibers 30 oriented substantially parallel to one another. The fibers 30 in each layer 60 are oriented perpendicularly relative to the fiber 30 in adjacent layers 60 forming a cross-ply configuration of the composite article 10 similar to that which is illustrated in FIG. 2. However, the fibers 30 may be arranged in any orientation relative to one another within the composite article 10 and are not limited to the arrangements illustrated in FIGS. 2 and 3. For example, the fibers 30 in each one of the layers 60 may be oriented parallel to the fibers 30 in adjacent layers 60 forming a unidirectional configuration 70 (FIG. 6) of the composite article 10. Even further, the fibers 30 in any given layer 60 may be oriented at any angle, without limitation, relative to the orientation of the fibers 30 in adjacent layers 60. For example, the fibers 30 of one layer 60 may be oriented at any non-perpendicular angle (i.e., 15°, 22.5°, 45°, 60°, 75°, etc.) relative to the fibers 30 of an adjacent one of the layers 60.

Although the composite article 10 is illustrated in FIG. 3 as having three layers 60 of fibers 30, any number of layers 60 may be provided. For example, the composite article 10 may contain a single layer 60 of fibers 30 or tens or more of the layers 60. The fibers 30 in one or more of the layers 60 may be arranged to be in contacting or non-contacting relation with the fibers 30 of adjacent layers 60. For example, FIG. 4 illustrates the layers 60 of fibers 30 arranged in non-contacting relation with the exception of the coupling of the fibers 30 at the connection sites 80 as illustrated in FIGS. 2 and 3 and illustrated in alternative embodiments in FIGS. 5-9 as discussed below.

Figure 4:
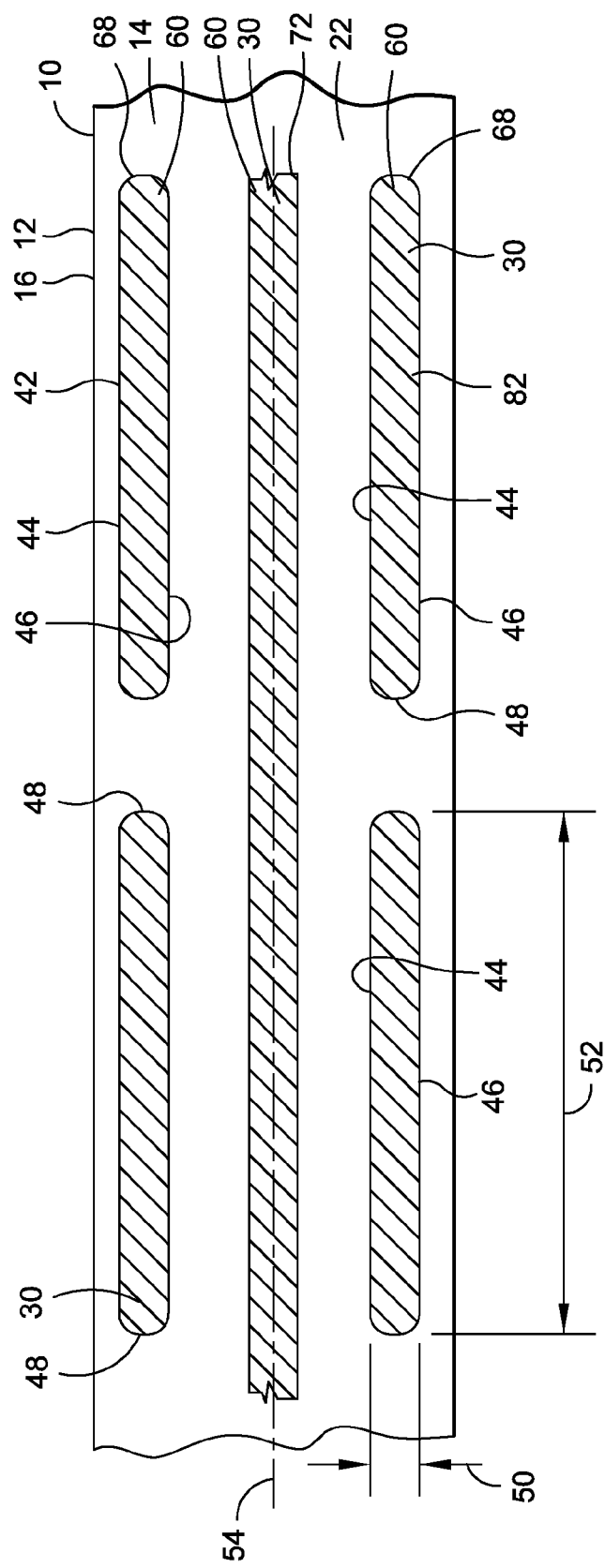
FIG. 4 is an enlarged sectional illustration of a composite article similar to that which is illustrated in FIG. 3 and illustrating an embodiment of the fibers having a generally elongated cross-sectional shape.

Referring to FIG. 4, shown is a cross-sectional illustration of a composite article 10 similar to that which is illustrated in FIG. 3 and illustrating an embodiment of the arrangement of the fibers 30 within the matrix 22. As can be seen in FIG. 4, the fibers 30 may be provided with an elongated cross-sectional shape having relatively flattened or substantially planar fiber 30 faces to minimize scattering of light that may otherwise occur when light strikes or passes through a curved surface. Advantageously, the substantially planar configuration of the fiber 30 upper and lower surface 44, 46 reduces optical distortion of the composite article 10. The generally elongated shape of the fibers 30 is preferably provided with a relatively high aspect ratio which may be defined as the ratio of the fiber width 52 to fiber thickness 50. In an embodiment, the aspect ratio may vary from approximately 3 to approximately 500 although the fiber 30 cross section may be provided in any aspect ratio. Furthermore, the fiber thickness 50 may be provided in any suitable thickness. In an embodiment, the thickness of the fiber 30 may be in the range of from approximately 5 microns to approximately 5,000 microns (e.g., 0.0002 to 0.20 inch). However, the fiber 30 may be provided in any fiber thickness 50, without limitation.

Referring still to FIG. 4, the elongated cross-sectional shape of the fibers 30 may include the pair of substantially planar fiber 30 faces (i.e., upper and lower surfaces 44, 46) which are preferably oriented to be substantially parallel to the article surface 12 of the composite article 10. However, the fibers 30 may be embedded and oriented within the matrix 22 such that the fiber 30 faces are arranged in any orientation relative to the article surface 12. Although illustrated as being substantially planar, the fiber 30 faces may be slightly curved including slightly concave, slightly convex or crowned and are not limited to a strictly substantially planar or flat profile. Even further, it is contemplated that the fiber 30 faces may include one or more surface features (not shown) on one or more of the fiber 30 faces and are not limited to the strictly rectangular elongated cross-sectional shape illustrated in FIG. 4.

Although FIG. 4 illustrates the fibers 30 in the upper and lower layers 60 as being oriented in spaced relation to one another, the fibers 30 in a layer 60 may be arranged such that a side edge 48 of a fiber 30 is placed in contacting relation with the side edge 48 of an adjacent one of the fibers 30. However, the fibers 30 may be arranged in any desirable spacing and are not limited to the fiber 30 spacing illustrated in FIG. 4. In addition, the composite article 10 may be configured such that the volume of fibers 30 relative to the total volume of the composite article 10 may be in the range of from approximately 10% to 90%. However, the fibers 30 may comprise any portion of the total volume of the composite article 10.

Figure 5:
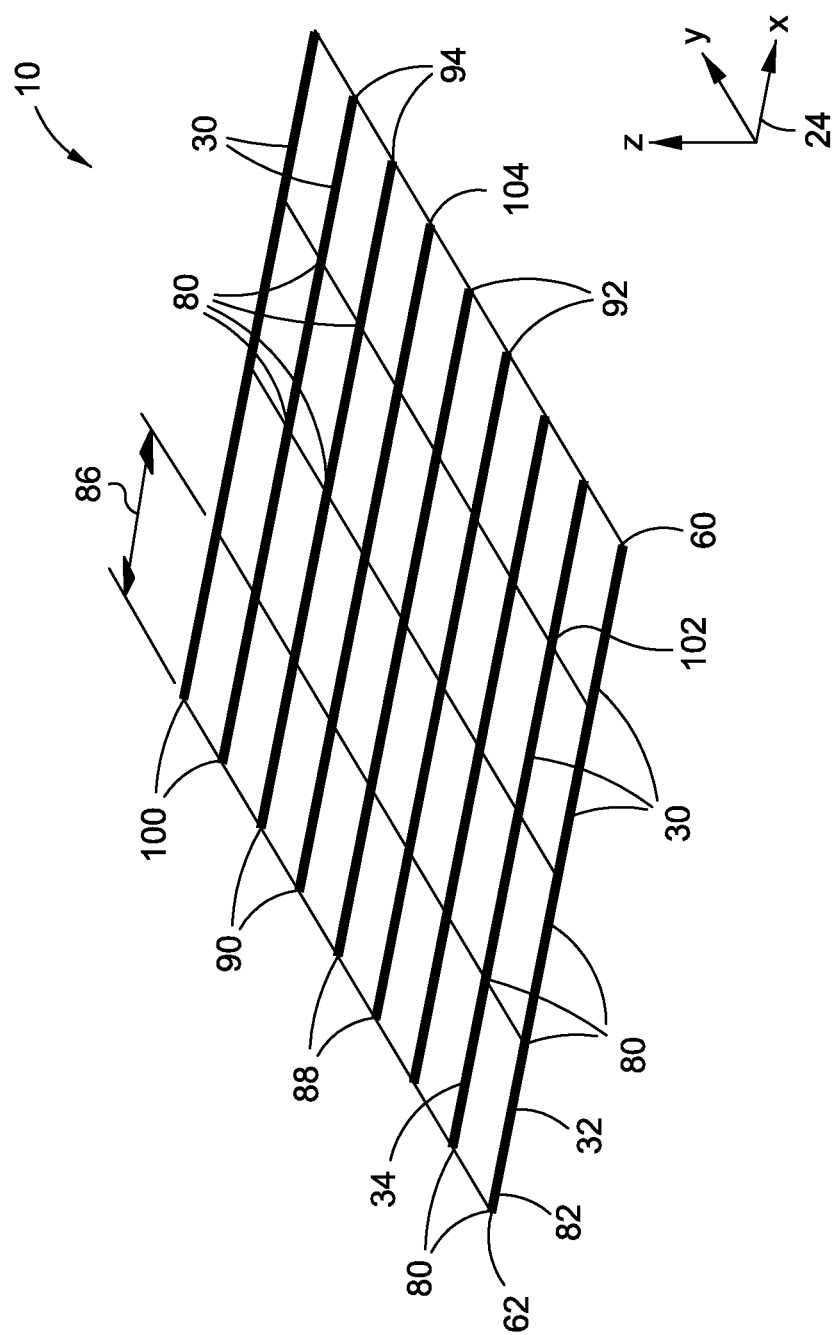
FIG. 5 is a schematic illustration of a single layer of fibers connected to one another at a plurality of connection sites and representing in-plane adjacent fiber coupling.

Referring now to FIG. 5, shown is a perspective schematic illustration of an arrangement for selective coupling of fibers 30 illustrating in-plane coupling 82 similar to the in-plane coupling 82 illustrated in FIG. 2. FIG. 5 illustrates a plurality of fibers 30 oriented in substantially parallel relation to one another. The fibers 30 are illustrated in relatively heavy line weight and may be selectively coupled at connection sites 80 which are illustrated in relatively lighter line weights compared to the line weights representing the fibers 30. The arrangement of fibers 30 in FIG. 5 represents a single layer 60 wherein the fibers 30 may be connected to one another at least one discrete connection site 80.

The fibers 30 illustrated in FIG. 5 may be selectively coupled to one another at the connection sites 80 using a selected connection type 88 which may have selected connection qualities to provide the desired response of the composite article 10 during an impact event. More specifically, FIG. 5 illustrates a first fiber 32 and a second fiber 34 of the plurality of fibers 30 which may be connected to one another at a plurality of discrete connection sites 80. The connection sites 80 may be distributed in a variety of arrangements along the lengths of the fibers 30. For example, FIG. 5 illustrates a relatively uniform spacing 86 of the connection sites 80 along the length of the fibers 30. However, the connection sites 80 connecting the adjacent fibers 30 may be spaced at a predetermined periodicity along the length of the fibers 30 as described in greater detail below.

The first and second fibers 32, 34 may be connected to one another at a plurality of the discrete connection sites 80 by adhesive bonding 90, thermoplastic fusing 92, and/or mechanical pinning 94 or other suitable connection types 88. Adhesive bonding 90 may comprise bonding the fibers 30 at the connection sites 80 using a suitable adhesive such as epoxy to directly bond the fibers 30 to one another at the selected connection sites 80. However, other suitable adhesives may be used to bond the fibers 30 together at the selected connection sites 80. In another embodiment, the connection type 88 may comprise thermoplastically fusing or welding the fibers 30 together at the connection sites 80. For example, the fibers 30 may be locally heated above the glass transition temperature in order to thermoplastically fuse or weld the fibers 30 together. The side edges 48 of the fibers 30 similar to the side edges 48 illustrated in FIG. 4 may be locally heated in order to fuse or weld the fibers 30 together at the connection sites 80.

Referring still to FIG. 5, in a further embodiment, the fibers 30 may be locally mechanically coupled by mechanical pinning 94. For example, surface features for mechanically coupling the fibers 30 together at the connection sites 80 may be applied to the side edges 48 (FIG. 4) of the fibers 30 to couple the fibers 30 together. In this regard, any suitable portion of the fibers 30 may be mechanically coupled together at the connection site 80. In a non-limiting embodiment, the mechanical pinning 94 may comprise increasing the surface roughness at a local point along the fibers 30 to reduce or prevent relative axial movement of the fibers 30. In a further embodiment, notches (not shown), scallops (not shown) or other features may be applied to the fiber surfaces 42 (FIG. 4) to mechanically pin 94 the fibers 30 together and restrict or resist relative axial movement of the fibers 30 relative to one another. The coupling or connection between the fibers 30 may limit the degree of relative movement of the fibers 30. More specifically, the connection of the fibers 30 to one another at the connection sites 80 may limit the degree of movement of the fibers 30 relative to one another and/or limit the movement of the fibers 30 relative to the matrix 22.

The selection of the connection type 88 (FIG. 5) may be based upon the desired degree of connectivity. For example, a connection type 88 may be selected to provide a connection strain 102 (FIG. 5) that may be lower than the failure strain of the matrix 22 to limit the amount of movement of the fibers 30 relative to one another. In the context of the present disclosure, strain comprises failure strain which represents the strain at which the connection between fibers 30 fails or breaks. In addition, in the context of the present disclosure, properties such as strength and strain are in terms of dynamic properties and/or quasi-static properties. In an arrangement wherein the connection type 88 comprises a relatively low connection strain 102, a relatively strong interaction may occur between the coupled fibers 30 during an impact event. In an embodiment, the connection between the fibers 30 may be characterized as a connection having a failure strain that differs by at least approximately 25% relative to the failure strain of the matrix 22. For example, the connection may have a failure strain that is at least 25% higher than the failure strain of the matrix 22. Alternatively, the connection may have a failure strain that is at least 25% lower than the failure strain of the matrix 22. However, the connection may include a failure strain comprising any percentage of the failure strain of the matrix 22.

In addition, the connection between fibers 30 such as the first and second fibers 32, 34 illustrated in FIG. 5 may be defined by a connection strength 104 relative to the tensile strength of the matrix 22. In this regard, the connection strength 104 between the fibers 30 may be characterized as a connection having a tensile strength that differs by at least approximately 25% relative to the tensile strength of the matrix 22. For example, the connection strength 104 may be 25% higher than the tensile strength of the matrix 22. Alternatively, the connection strength 104 may be 25% lower than the tensile strength of the matrix 22. However, the connection strength 104 may include a tensile strength comprising any percentage of the tensile strength of the matrix 22 and is not limited to a connection strength 104 that differs by at least approximately 25% relative to the tensile strength of the matrix 22.

FIG. 5 illustrates the coupling of fibers 30 in an in-plane coupling 82 configuration wherein the fibers 30 that are coupled are located immediately adjacent to one another in the same layer 60. In this regard, although the Figures generally illustrate coupling of adjacent fibers 30, it is contemplated that coupling of the fibers 30 may include coupling of non-adjacent fibers 30. As can be seen in FIG. 5, a first layer 62 includes first and second fibers 32, 34 that are located adjacent to one another and are coupled to one another at discrete connection sites 80. The connection sites 80 may be spaced at any desired interval including a pattern or periodicity of spacing 86. Such a pattern or periodicity of spacing 86 may facilitate manufacturing of the fibers 30 and/or composite article 10. However, the spacing 86 of the connection sites 80 in any of the Figures may be random or a combination of random and periodic spacing 86 of the connection sites 80 and which may vary in any desired manner in order to achieve a desired failure response of any given portion of the composite article 10 as described in greater detail below.

Referring still to FIG. 5, the in-plane coupling 82 of the fibers 30 may generally define a planar layer 60 of the fibers 30 which may be described as being generally parallel to the x-y plane of a reference coordinate system 24 as illustrated in FIG. 5. Out-of-plane coupling 84 as illustrated in FIGS. 6-9 may comprise coupling that is non-coincident with the x-y plane such as coupling oriented generally along the z-axis of the reference coordinate system 24. However, out-of-plane coupling 84 may include coupling at any angle relative to the x-y plane such as the out-of-plane coupling 84 illustrated in FIG. 9.

Figure 6:
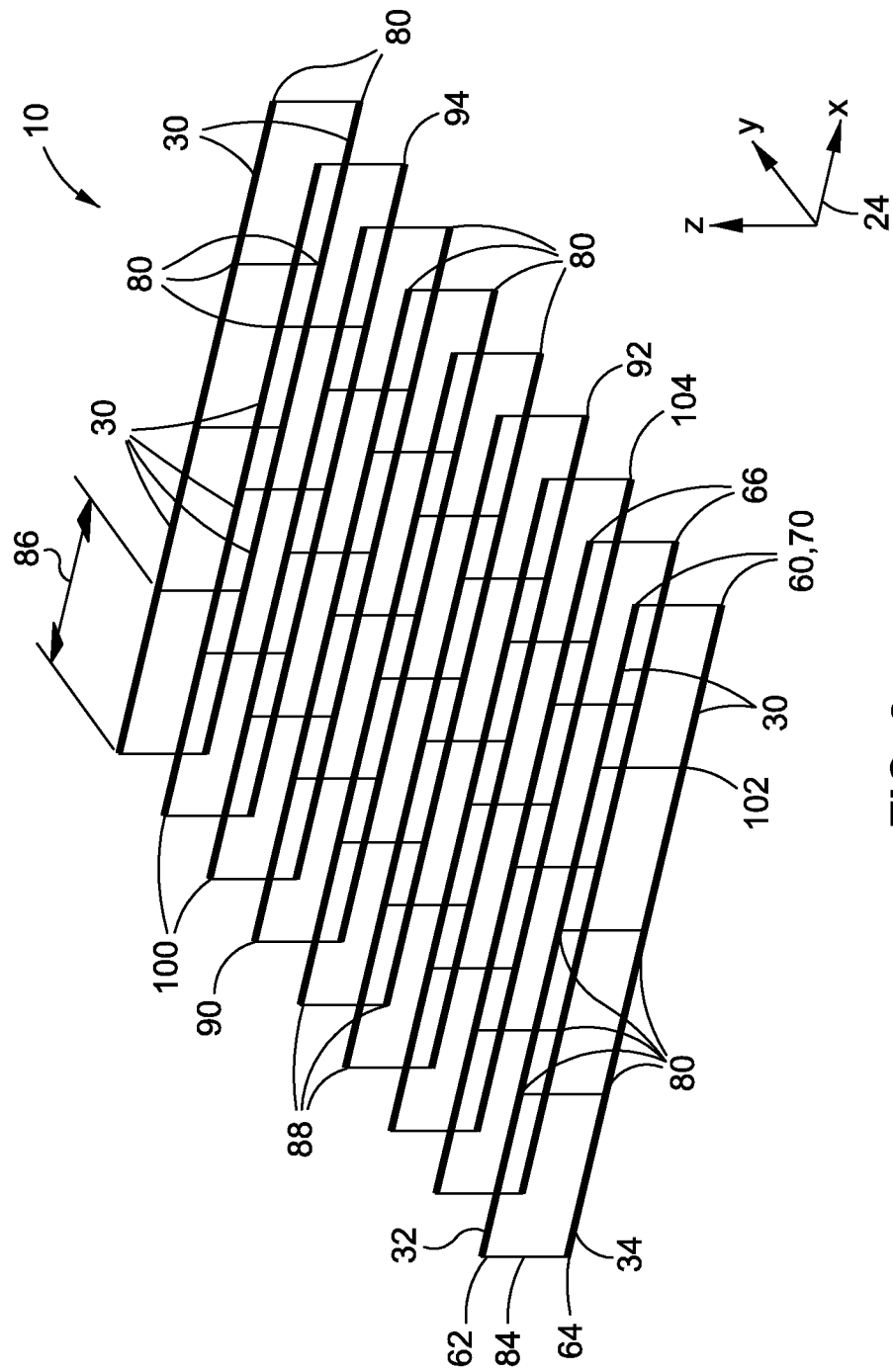
FIG. 6 is a schematic illustration of the fibers wherein the layers are arranged in a unidirectional configuration and wherein the fibers are connected at a plurality of connection sites across the layers representing out-of-plane adjacent fiber coupling in a unidirectional configuration of the composite article.

FIG. 6 illustrates an out-of-plane coupling 84 of fibers 30 using the connection sites 80. More specifically, FIG. 6 illustrates a first layer 62 and a second layer 64 each including a plurality of fibers 30. The first layer 62 may include a first fiber 32. The second layer 64 may include a second fiber 34. The first fiber 32 of the first layer 62 may be located adjacent to the second fiber 34 of the second layer 64. As can be seen in FIG. 6, each one of the first and second layers 62, 64 includes a plurality of the fibers 30 which are each oriented to be substantially parallel to one another such that the arrangement in FIG. 6 forms a unidirectional configuration 70 of layers 60.

In FIG. 6, the fibers 30 in each one of the layers 60 may be generally aligned with one another in order to facilitate out-of-plane coupling 84 wherein the adjacently disposed fibers 30 are connected at the connection sites 80 along a direction which may be parallel to the z-axis of the reference coordinate system 24 illustrated in FIG. 6. Although the connection sites 80 in FIG. 6 are illustrated as being arranged in a uniform spacing, the connection sites 80 may be spaced at any one of a variety of different spacing 86 arrangements. For example, the connection sites 80 may be spaced at a predetermined periodicity along the length of the fibers 30. The periodicity for the spacing 86 of the connection sites 80 may comprise a substantially uniform spacing 86 as illustrated in FIGS. 5 and 6. However, the periodicity may comprise a geometrically varying or progressing (i.e., progressively increasing or decreasing) spacing along the length of the fibers 30. The connection sites 80 may be spaced in a variety of other arrangements including random spacing or a sinusoidal periodicity of the spacing or other suitable spacing arrangements which may be tailored for the application.

Figure 7:
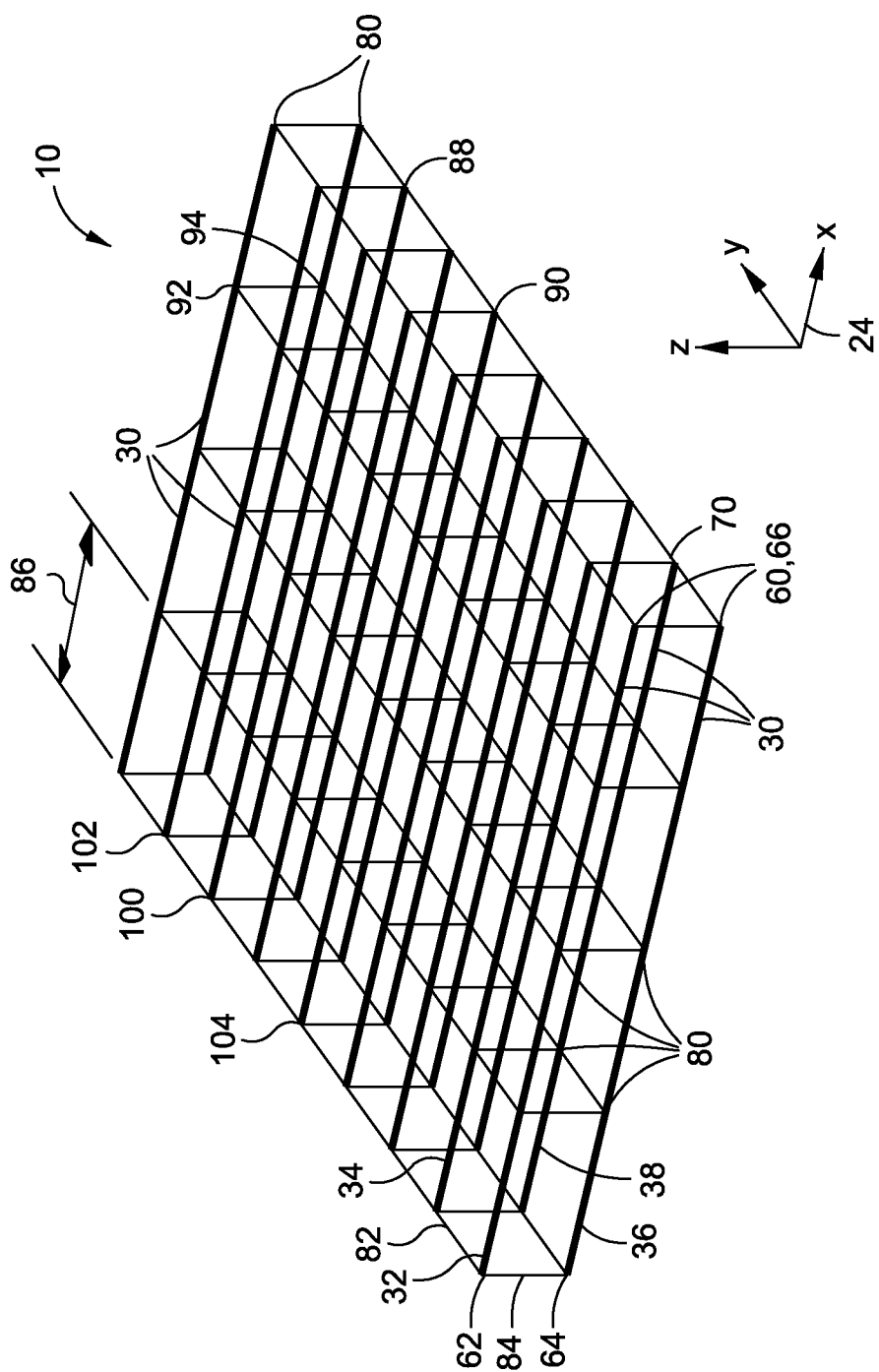
FIG. 7 is a schematic illustration of a pair of layers of fibers arranged in a unidirectional configuration and illustrating a plurality of connection sites connecting the adjacent fibers and representing in-plane and out-of-plane adjacent fiber coupling in a unidirectional configuration of the composite article.

Referring now to FIG. 7, shown is a further embodiment of a configuration for selectively coupling fibers 30 and which combines the in-plane coupling 82 configuration illustrated in FIG. 5 with the out-of-plane coupling 84 configuration illustrated in FIG. 6. For example, FIG. 7 illustrates an arrangement wherein a first layer 62 includes first and second fibers 32, 34 and a second layer 64 includes third and fourth fibers 36, 38. The third and fourth fibers 36, 38 are oriented substantially parallel to the first and second fibers 32, 34. In this regard, the fibers 30 in each one of the first and second layers 62, 64 may be oriented substantially parallel to one another such that FIG. 7 illustrates a unidirectional configuration 70 of the layers 60. FIG. 7 illustrates in-plane coupling 82 wherein the first and second fibers 32, 34 in the first layer 62 are illustrated as being interconnected at a plurality of the connection sites 80. Likewise, the third and fourth fibers 36, 38 in the second layer 64 are illustrated as being interconnected at a plurality of the connection sites 80.

In FIG. 7, out-of-plane coupling 84 is provided by connecting the first fiber 32 in the first layer 62 with the third fiber 36 in the second layer 64 and connecting the second fiber 34 in the first layer 62 with the fourth fiber 38 in the second layer 64 using one or more connection sites 80. FIG. 7 illustrates coupling of fibers 30 which are disposed immediately adjacent to one another. However, the present disclosure contemplates coupling of non-adjacent fibers 30. Furthermore, FIG. 7 illustrates coupling of fibers 30 in the first layer 62 which are aligned with fibers 30 in the second layer 64. However, it is contemplated that the fibers 30 in different layers 60 may not necessarily be vertically aligned with one another but may be horizontally offset (i.e., relative to the y-axis).

Figure 8:
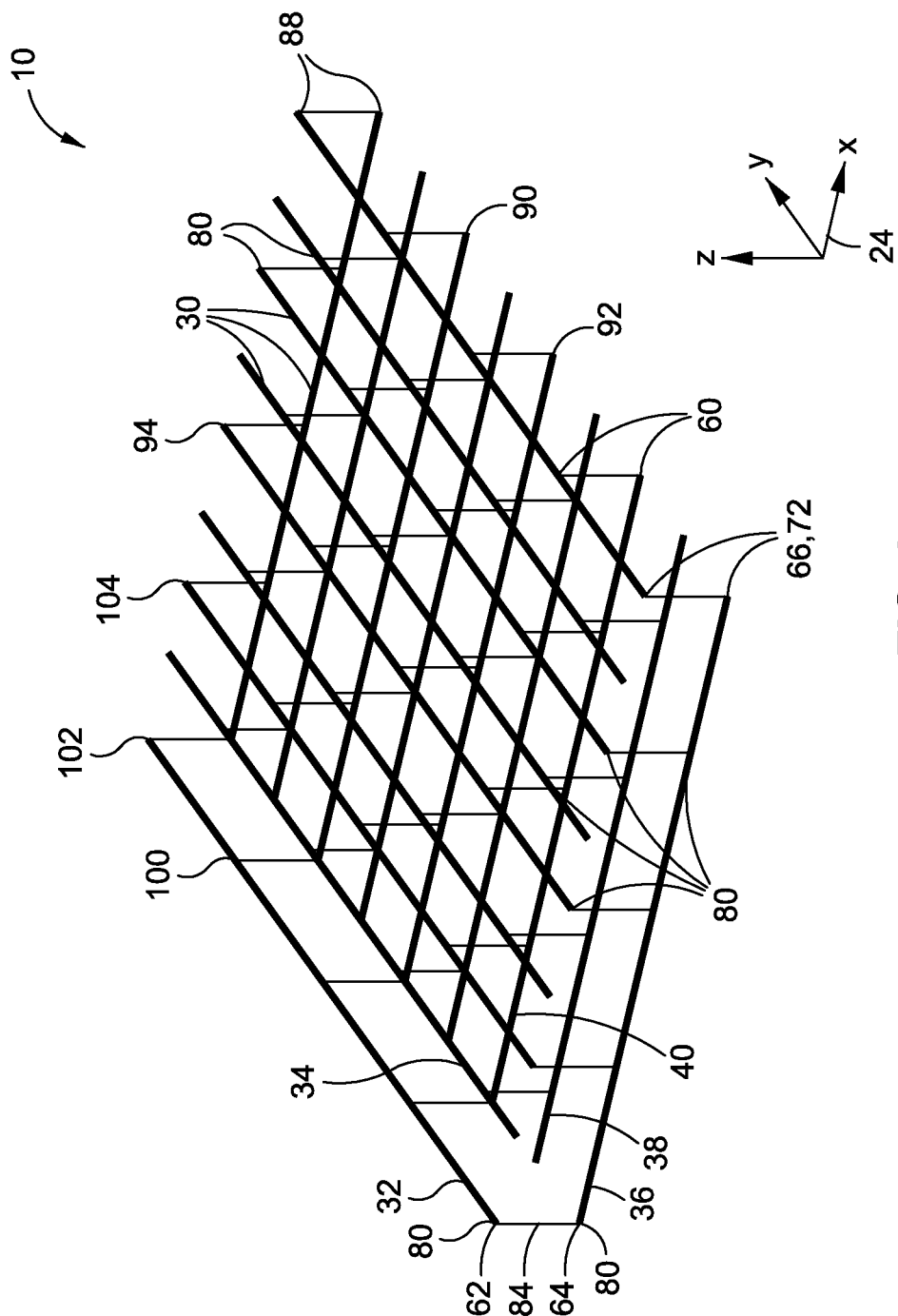
FIG. 8 is a schematic illustration of a pair of layers of fibers arranged in a cross-ply configuration and illustrating a plurality of connection sites connecting the fibers across the layers in a staggered arrangement representing out-of-plane adjacent fiber coupling in a cross-ply configuration of a composite article.

Referring to FIG. 8, shown is an arrangement illustrating fiber 30 coupling for a cross-ply configuration 72 of the layers 60. FIG. 8 illustrates out-of-plane coupling 84 of the fibers 30 in one layer 60 to the fibers 30 in another layer 60. For example, in FIG. 8, shown is a first layer 62 which includes first and second fibers 32, 34 which are located immediately adjacent to one another. As can be seen, the fibers 30 in the first layer 62 are substantially parallel to one another. A second layer 64 in FIG. 8 includes third, fourth and fifth fibers 36, 38, 40 which are also oriented substantially parallel to one another but which are oriented substantially perpendicularly relative to the first and second fibers 32, 34. In this regard, the first and second layers 62, 64 illustrate a cross-ply configuration 72 of the layers 60 as implemented in the composite article 10 illustrated in FIGS. 2 and 3.

Referring still to FIG. 8, it can be seen that the third and fifth fibers 36, 40 are located immediately adjacent to the fourth fiber 38 and are located on opposite sides of the fourth fiber 38. Out-of-plane coupling 84 of the first and second layers 62, 64 may be facilitated by connecting the first fiber 32 to each one of the third and fifth fibers 36, 40 at the noted connection sites 80 which may be at the approximate location of the shortest distance between the first fiber 32 and the third and fifth fibers 36, 40. Likewise, the second fiber 34 may be coupled to the fourth fiber 38 at a connection site 80 located approximately at the shortest distance between the second fiber 34 and the fourth fiber 38. The arrangement illustrated in FIG. 8 represents out-of-plane coupling 84 of the fibers 30 in a staggered arrangement.

Figure 9:
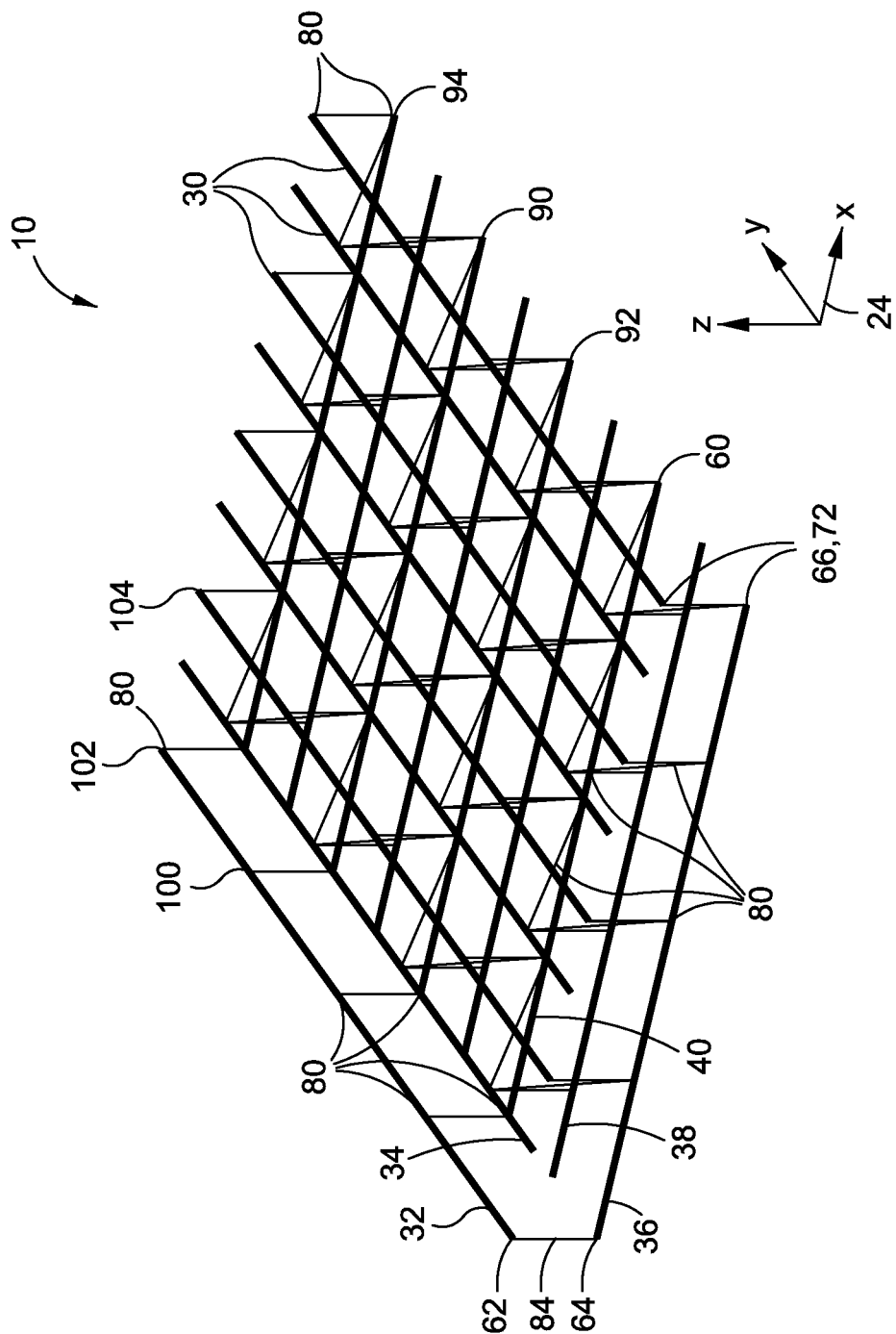
FIG. 9 is a schematic illustration of a pair of layers of fibers arranged in a cross-ply configuration and illustrating a plurality of connection sites connecting the fibers across the layers and representing coupling of the fibers in one layer with adjacent and non-adjacent fibers in an adjacent layer in a cross-ply configuration of the composite article.

Referring to FIG. 9, shown is a variation of the embodiment illustrated in FIG. 8 and wherein FIG. 9 illustrates out-of-plane coupling 84 of the first layer 62 with the adjacent fibers 30 in the second layer 64. FIG. 9 additionally illustrates staggered out-of-plane coupling 84 of non-adjacent fibers 30. For example, FIG. 9 illustrates the second fiber 34 being further connected or coupled to the third and fifth fibers 36, 40 at the location of the connection sites 80 where the third and fifth fibers 36, 40 are connected to the first fiber 32. In this regard, FIG. 9 illustrates coupling of multiple fibers 30 at a single connection site 80 which may provide improved or stronger interaction between the coupled fibers 30 relative to fiber 30 coupling having only a single connection at a single connection site 80.

FIGS. 5-9 illustrate configurations for coupling fibers 30 in different layers 60 to achieve a desired response in the composite article 10 such as to an impact event. For example, FIGS. 5-9 illustrate in-plane coupling 82, out-of-plane coupling 84 and combinations of in-plane coupling 82 and out-of-plane coupling 84 for adjacent and non-adjacent fibers 30 and for unidirectional configurations 70 and cross-ply configurations 72. However, as was earlier indicated, the fibers 30 of one layer 60 may be arranged at any orientation relative to the fibers 30 of adjacent layers 60 including any non-perpendicular orientation relative to the fibers 30 of adjacent layers 60 and are not limited to unidirectional configurations 70 and cross-ply configurations 72.

The fibers 30 and matrix 22 (FIGS. 1-9) may be comprised of any substantially optically transparent material. However, the fiber 30 and matrix 22 may be comprised of materials providing reduced optical transparency including, but not limited to, substantially opaque materials or materials having any desired level of transparency between substantially transparent and substantially opaque. In an embodiment, the matrix 22 and/or fibers 30 may be formed of thermoplastic material which may comprise at least one of the following materials: fluorocarbons, polyamides, polyethylenes, polyesters, polypropylenes, polycarbonates, polyurethanes, polyetheretherketone, polyetherketoneketone and polyetherimide. In addition, the matrix 22 and/or fibers 30 may be formed of any suitable thermoset including, but not limited to, polyurethanes, phenolics, polyimides, bismaleimides, polyesters and epoxies. Even further, the matrix 22 and/or the fibers 30 may be formed of glass material comprising E-glass (i.e., alumino-borosilicate glass), S-glass (i.e., alumino silicate glass), pure silica, borosilicate glass, optical glass and other suitable glasses. The fibers 30 and/or the matrix 22 may also be formed of inorganic materials including, but not limited to, carbons, silicon carbide, and boron. The fibers 30 may additionally be formed of metallic material.

Figure 10:
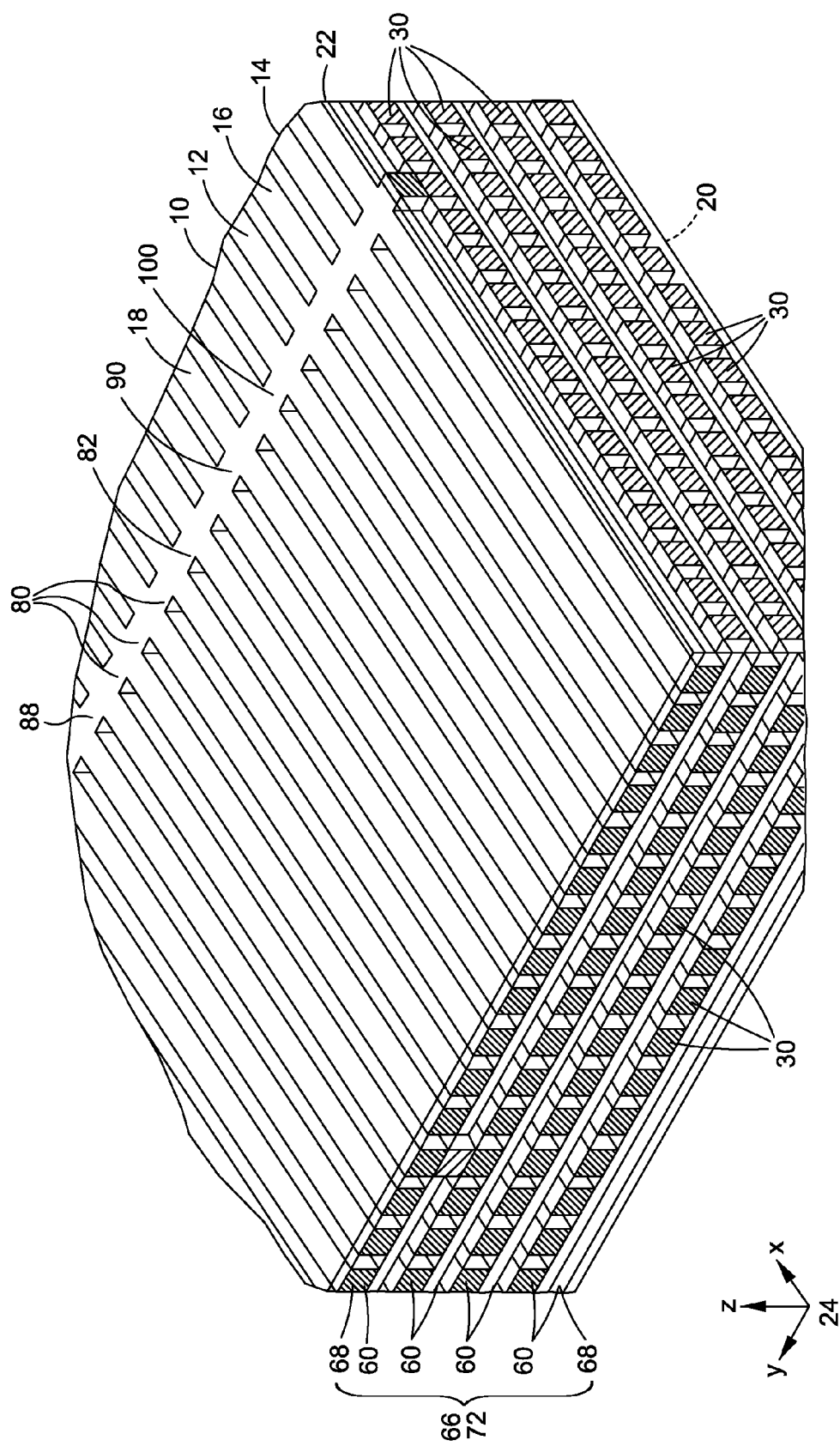
FIG. 10 is an illustration of a composite article including a plurality of layers and illustrating an outermost layer of fibers connected with a plurality of connection sites in an in-plane configuration.

Referring to FIG. 10, shown is an illustration of a composite article 10 having a plurality of layers 60 arranged in a cross-ply configuration 72. The composite article 10 illustrated in FIG. 10 includes a stack 66 of layers 60 having an outermost layer 68 located on an uppermost portion of the composite article 10 and an outermost layer 68 on a lowermost side of the composite article 10. In an embodiment, the composite article 10 may be configured as a panel 14 for providing ballistic protection. The fibers 30 in the outermost layer 68 may be disposed immediately adjacent to a strike face 18 of the panel 14. The strike face 18 may comprise the side of the panel 14 intended or configured to receive impacts such as from a projectile. A back face 20 of the panel 14 may be located on an opposite side of the panel 14 as illustrated in FIG. 10. The outermost layers 68 are each illustrated in FIG. 10 as comprising a plurality of substantially parallel fibers 30 being coupled to one another at a plurality of connection sites 80 such that each outermost layer 68 illustrated in FIG. 10 represents in-plane coupling 82 of the fibers 30 similar to that which is schematically illustrated in FIG. 5. The layers 60 may be embedded in a suitable matrix 22. For example, the matrix 22 may comprise a resin such as an epoxy. In another non-limiting embodiment, the fibers 30 may optionally comprise metal fibers 30 embedded in a ceramic or glass matrix 22 although the fibers 30 and the matrix 22 may be formed of a variety of different materials and combinations of materials as indicated above.

Figure 11:
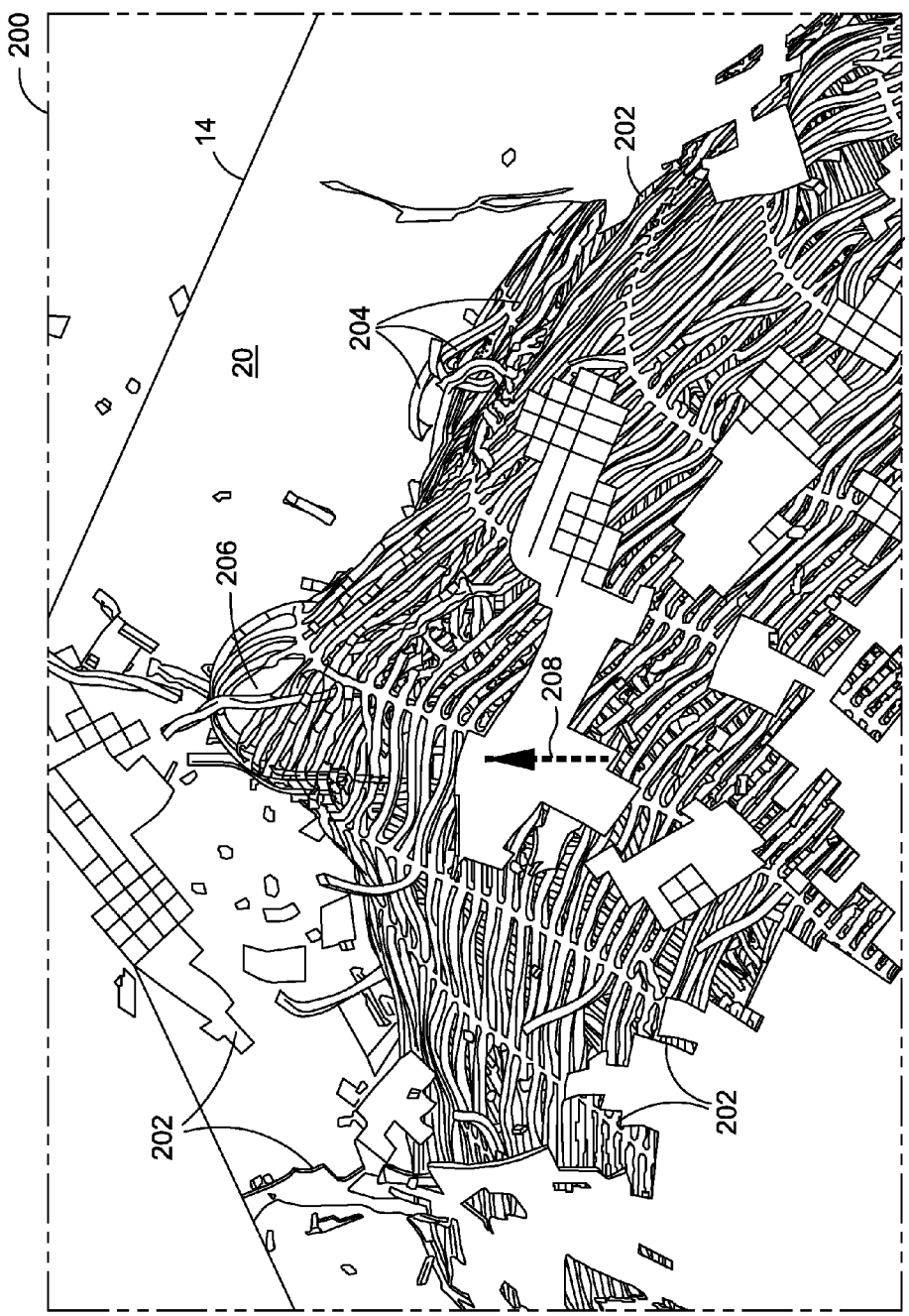
FIG. 11 is an illustration of a computer simulated impact event of a projectile impacting a composite article and illustrating in-plane coupling of the fibers preventing wedging of the projectile between the fibers.

Referring to FIG. 11, shown is a computer simulated impact event 200 wherein a projectile 206 moving along the direction indicated by the arrow 208 has partially passed through a panel 14 similar to the panel 14 illustrated in FIG. 10. FIG. 11 illustrates the effects of the projectile 206 impact on the back face 20 of the panel 14. As can be seen in FIG. 11, the projectile 206 may be decelerated and captured without completely passing through the composite article 10 as a result of the selective coupling of the fibers 30 (FIGS. 5-9) at the plurality of connection sites 80 (FIGS. 5-9). Although the back face 20 is illustrated in the computer simulation as exhibiting matrix cracking 202 and fiber disbonding 204, the selective coupling of the fibers 30 in the outermost layer 68 (FIG. 10) of the back face 20 may prevent wedge-through of the projectile 206 between the coupled fibers 30.

As was earlier indicated, the selective coupling of the fibers 30 such as the in-plane coupling 82 illustrated in FIG. 11 may be achieved by adhesive bonding 90 (FIG. 5), thermoplastic fusing 92 (FIG. 5), mechanical pinning 94 (FIG. 5) and other suitable means. Furthermore, the selective coupling of the fiber 30 may be tuned or tailored to the environment or application for which the composite panel 14 is intended. For example, the periodicity of the connection sites 80 (FIGS. 5-9) coupling the fibers 30 may be selected to provide the desired amount of interaction between the coupled fibers 30 during an impact event. In addition, the degree of connectivity of the fibers 30 may be selected to achieve the desired ballistic performance. For example, one or more connection sites 80 may be configured with a connection strain 102 (FIG. 5) that may be lower than the failure strain of the matrix 22 for tying the fibers 30 together in a manner to prevent relative movement and minimizing or eliminating wedge-through of a projectile 206 (FIG. 11). The selective coupling may be tailored to provide a limited amount of damage during an impact event in order to preserve the optical transparency of the non-impacted portions of the panel 14 (FIG. 11).

Figure 12:
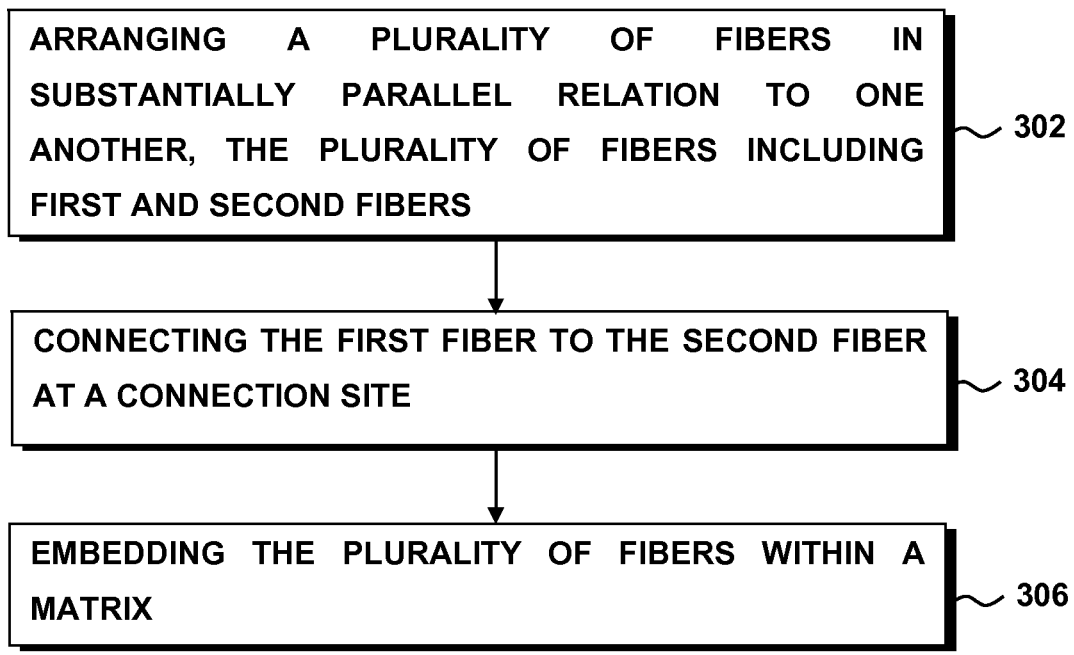
FIG. 12 is an illustration of a flow diagram of one or more operations that may be included in a methodology for manufacturing a composite article having a plurality of connection sites.

Referring to FIG. 12, shown is an illustration of a flow diagram comprising one or more operations which may be implemented in a methodology for manufacturing a composite article 10. Step 302 of FIG. 12 may comprise arranging a plurality of fibers 30 in substantially parallel relation to one another and wherein the fibers 30 may comprise first and second fibers 32, 34. In this regard, FIGS. 5-9 illustrate the fibers 30 in each one of the layers 60 as being oriented substantially parallel to one another. The fibers 30 in the Figures are illustrated as being arranged in relatively uniform spacing 86 across the width of the layer 60. However, as was indicated above, the present disclosure contemplates non-uniform or varying spacing of the fibers 30 in order to provide a desired response to a ballistic event or to provide a desired level of optical or mechanical performance.

Referring still to FIG. 12, Step 304 of the methodology of manufacturing the composite article 10 may comprise connecting the first fiber 32 to the second fiber 34 similar to that which is illustrated in FIG. 5. In this regard, the connection between the first fiber 32 and the second fiber 34 may be implemented at a plurality of connection sites 80. As was earlier indicated, such connection sites 80 may be achieved using one or more connection types 88 (FIG. 5) including, but not limited to, adhesive bonding 90 (FIG. 5), thermoplastic fusing 92 (FIG. 5), mechanical pinning 94 (FIG. 5) and other means for coupling the fibers 30 at the connection sites 80.

The fibers 30 may be coupled in an in-plane 82 configuration similar to that which is illustrated in FIG. 5 wherein the first fiber 32 may be connected to a second fiber 34 of the plurality of fibers 30 in a first layer 62 and wherein the first and second fibers 32, 34 may be located adjacent to one another. Alternatively, the methodology may comprise arranging the plurality of fibers 30 in two layers 60 comprising a first layer 62 and a second layer 64 similar to that which is illustrated in FIG. 6. As can be seen in FIG. 6, the first layer 62 may include the first fiber 32 and the second layer 64 may include the second fiber 34. The methodology may include locating the first and second fibers 32, 34 adjacent to one another and connecting the first and second fibers 32, 34 at one or more connection sites 80 to provide out-of-plane coupling 84 of the fibers 30.

Step 304 of FIG. 12 may further comprise coupling the fibers 30 of a plurality of layers 60 in a combination of in-plane 82 and out-of-plane coupling 84. For example, FIG. 7 illustrates a plurality of fibers 30 in the first layer 62 and the second layer 64. The first layer 62 is illustrated as including the first and second fibers 32, 34. The third and fourth fibers 36, 38 are included in the second layer 64. The fibers 30 in the first layer 62 are parallel to the fibers 30 in the second layer 64 such that FIG. 7 illustrates a unidirectional configuration 70 of the layers 60. Step 304 may comprise connecting the third and fourth fibers 36, 38 at a plurality of connection sites 80 to provide in-plane coupling 82 at the connection sites 80. The first and second fibers 32, 34 may likewise be coupled in-plane 82 at one or more connection sites 80. Out-of-plane coupling 84 may be achieved in Step 304 by connecting the first and second fibers 32, 34 to respective ones of the third and fourth fibers 36, 38 at a plurality of connection sites 80.

In constructing the arrangement illustrated in FIG. 8, the plurality of fibers 30 in the first layer 62 may include the first and second fibers 32, 34 which may be oriented substantially parallel to one another and which may be located immediately adjacent to one another. Likewise, the second layer 64 may include the third, fourth and fifth fibers 36, 38, 40 which also may be oriented substantially parallel to one another and perpendicularly relative to the first and second fibers 32, 34 of the first layer 62. Step 304 may comprise connecting the first fiber 32 to each one of the third and fifth fibers 36, 40 at connection sites 80 located approximately at the shortest distance between the first fiber 32 and the respective ones of the third and fifth fibers 36, 40. Likewise, the second fiber 34 may be connected to the fourth fiber 38 at the connection site 80 at the location of the shortest distance across the second fiber 34 and fourth fiber 38.

In this regard, Step 304 may comprise construction of a cross-ply configuration 72 of layers 60 wherein the fibers 30 in the layers 60 are connected in a staggered, out-of-plane coupling 84 configuration. FIG. 9 represents an additional level of connection between the fibers 30 by connecting the second fiber 34 to the third and fifth fibers 36, 40 at the connection sites 80 where the first fiber 32 is connected to the third and fifth fibers 36, 40. In this regard, FIG. 9 illustrates a means for staggered adjacent and non-adjacent fiber 30 coupling in an out-of-plane 84 configuration.

The fibers 30 (FIGS. 5-9) may be connected at the connection sites 80 by a suitable connection means including, but not limited to, adhesively bonding 90 the fibers 30 at the connection site 80 such as by localized heating of the side edges 48 (FIG. 4) or other portions of the fiber 30 to be bonded to the adjacent fibers 30 using a suitable adhesive such as an epoxy. The fibers 30 may be connected at the connection sites 80 by thermoplastically fusing 92 or welding such as by localized application of thermal energy or heat to localized portions of adjacent fibers 30. For example, the localized heating may comprise heating the fibers 30 to above the glass transition temperatures such that the fiber 30 material at the localized areas fuses together and are then allowed to cool. In a non-limiting embodiment, the localized heating of the fibers 30 may include a heating element to locally apply heat to the connections sites for locally fusing the fibers 30. Alternatively, the localized heating may comprise ultrasonically heating the fibers 30. In a further embodiment, the connection between the fibers 30 may be facilitated by mechanically pinning 94 (FIG. 5) the fibers 30 at the connection sites 80 such as by the application of localized increased surface roughness of the fibers 30 or by forming mechanical features on the fibers 30 such as by locally deforming the fibers 30 at the locations of the connection sites 80. For example, localized notches may be formed in the fiber surfaces 42 (FIG. 4) for engaging a corresponding mechanical feature formed in an adjacent fiber 30.

The connection quality 100 (FIGS. 5-9) of the coupling may also be selected to provide the desired degree of interaction between the coupled fibers 30 as mentioned above. For example, the connection quality 100 may comprise a connection strain 102 that may be lower than the failure strain of the matrix 22 and may also comprises a connection strength 104 that may be higher than the tensile strength of the matrix 22 to provide a high degree of interaction of the coupled fibers 30 during an impact event. As indicated above, strain comprises failure strain which represents the strain at which the connection between coupled fibers 30 fails or breaks. The connection quality 100 may alternatively comprise a connection strain 102 that may be higher than the failure strain of the matrix 22 and may also comprises a connection strength 104 that may be lower than the tensile strength of the matrix 22 to provide a low degree of interaction of the coupled fibers 30 during an impact event and/or to facilitate relatively greater amounts of movement of the coupled fibers 30 relative to one another.

In a non-limiting embodiment, each connection site 80 (FIGS. 5-9) may include a connection quality 100 (FIGS. 5-9) and may comprise a connection strain 102 (FIGS. 5-9) that differs from the failure strain of the matrix 22 by at least approximately 25 percent and/or a connection strength 104 (FIGS. 5-9) that differs from the tensile strength of the matrix 22 by at least approximately 25 percent. However, the connection quality 100 may comprise any desired combination of connection strain 102 and connection strength 104 relative to the failure strain and tensile strength of the matrix 22 to achieve a desired response of the composite article 10. The connection quality may be selected in consideration of factors including, but not limited to, environmental factors such as temperature and humidity and/or as a function of event parameters including, but not limited to, projectile velocity, mass, hardness, geometric size, cross-sectional area and other factors.

Advantageously, selective coupling of the fibers 30 (FIGS. 5-9) provides a means for improving the ballistic performance of a panel 14 or other composite article 10 by increasing the resistance of the fibers 30 to wedging of a projectile 206 (FIG. 11). In addition, selective coupling of the fibers 30 may facilitate control of the extent or size of area that is damaged by an impact event. Likewise, controlled coupling of the fibers 30 by selective coupling at connection sites 80 may provide a means for attaining a desired degree of panel 14 stiffness or resistance to bending and minimizing optical distortion in non-impacted portions of the panel 14.

Step 306 of FIG. 12 may comprise at least partially embedding the fibers 30 in a matrix 22 similar. As indicated above, the matrix 22 is preferably formed of substantially optically transparent material. Likewise, the fibers 30 are preferably formed of substantially optically transparent material. Step 306 may include curing or solidifying the matrix 22 and/or fibers 30 to form the composite article 10. In this regard, the composite article 10 may be subjected to heat and/or pressure to facilitate curing or solidifying Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A composite article, comprising:
a plurality of fibers at least partially embedded within a matrix and including a first fiber and a second fiber oriented in substantially parallel relation to one another;
the first fiber and the second fiber each having a pair of parallel substantially planar fiber faces oriented substantially parallel to an article surface of the composite article; and
the first and second fibers being connected to one another at at least one discrete connection site.

2. The composite article of claim 1 wherein:
the first fiber is connected to the second fiber at a plurality of the connection sites.

3. The composite article of claim 1 further comprising:
a first layer of the fibers including the first and second fibers.

4. The composite article of claim 1 further comprising:
a first layer of the fibers including the first fiber; and
a second layer of the fibers including the second fiber.

5. The composite article of claim 1 further comprising:
a first layer including the first and second fibers; and
a second layer including third and fourth fibers oriented substantially parallel to the first and second fibers;
the first fiber being connected to the second fiber at at least one connection site;
the third fiber being connected to the fourth fiber at at least one connection site;
at least one of the first and second fibers being connected to one of the third and fourth fibers at at least one connection site.

6. The composite article of claim 5 wherein:
the first and second fibers are disposed immediately adjacent to one another;
the third and fourth fibers being disposed immediately adjacent to one another; and
each one of the first and second fibers being generally aligned with and connected to a respective one of the third and fourth fibers at at least one connection site.

7. The composite article of claim 1 further comprising:
a first layer including the first and second fibers disposed immediately adjacent to one another; and
a second layer including third, fourth and fifth fibers oriented substantially parallel to one another and substantially perpendicularly relative to the first and second fibers;
the third and fifth fibers being disposed immediately adjacent to the fourth fiber on opposite sides thereof;
the first fiber being connected to each one of the third and fifth fibers at connection sites at an approximate location of a shortest distance therebetween;
the second fiber being connected to the fourth fiber at at least one connection site at an approximate location of a shortest distance therebetween.

8. The composite article of claim 7 wherein:
the second fiber is further connected to the third and fifth fibers approximately at the location of the connection sites where the third and fifth fibers are connected to the first fiber.

9. The composite article of claim 1 wherein the first and second fibers are connected at the connection site using at least one of the following connection types:
adhesive bonding;
thermoplastic fusing; and
mechanical pinning.

10. The composite article of claim 1 wherein the connection between the first and second fibers at the connection site comprises at least one of the following:
a connection failure strain that differs from the failure strain of the matrix by at least 25 percent;
a connection strength that differs from the tensile strength of the matrix by at least 25 percent.

11. The composite article of claim 1 wherein:
the fibers comprise a substantially optically transparent fiber; and
the matrix comprising a substantially optically transparent polymeric matrix.

12. The composite article of claim 1 wherein at least one of the matrix and the fibers are formed from at least one of the following materials:
a thermoplastic material comprising at least one of the following: fluorocarbons, polyamides, polyethylenes, polyesters, polypropylenes, polycarbonates, polyurethanes, polyetheretherketone, polyetherketoneketone, polyetherimide; and
a thermoset comprising at least one of the following: polyurethanes, phenolics, polyimides, bismaleimides, polyesters, epoxy; and
glass comprising E-glass (alumino-borosilicate glass), S-glass (alumino silicate glass), pure silica, borosilicate glass, optical glass.

13. A composite panel, comprising:
a plurality of fibers at least partially embedded within a matrix and including a first fiber and a second fiber oriented in substantially parallel relation to one another;
the first fiber and the second fiber each having a pair of parallel substantially planar fiber faces oriented substantially parallel to an article surface of the composite article;
a first layer including the first and second fibers; and
the first and second fibers being connected to one another at a plurality of discrete connection sites.

14. A method of manufacturing a composite article, comprising the steps of:
arranging a plurality of fibers in substantially parallel relation to one another, the plurality of fibers including first and second fibers, the first and second fibers each having a pair of parallel substantially planar fiber faces oriented substantially parallel to an article surface of the composite article;
connecting the first fiber to the second fiber at at least one connection site; and
embedding the plurality of fibers within a matrix.

15. The method of claim 14 further comprising the steps of:
arranging the plurality of fibers in a first layer including the first and second fibers; and
locating the first and second fibers adjacent to one another.

16. The method of claim 14 further comprising the steps of:
arranging the plurality of fibers in a first layer and a second layer;

including the first fiber in the first layer;
including second fiber in the second layer; and
locating the first and second fibers adjacent to one another.

17. The method of claim 14 further comprising the steps of:
arranging the plurality of fibers in a first layer and a second layer;
including the first and second fibers in the first layer;
including third and fourth fibers in the second layer;
orienting the third and fourth fibers substantially parallel to the first and second fibers;
connecting the third and fourth fibers at at least one discrete connection site; and
connecting at least one of the first and second fibers to one of the third and fourth fibers at at least one discrete connection site.

18. The method of claim 17 further comprising the steps of:
locating the first and second fibers immediately adjacent to one another;
locating the third and fourth fibers immediately adjacent to one another;
generally aligning each one of the first and second fibers with respective ones of the third and fourth fibers; and
connecting the first and second fibers to respective ones of the third and fourth fibers at connection sites.

19. The method of claim 14 further comprising the steps of:
arranging the plurality of fibers in a first layer and a second layer;
including the first and second fibers in the first layer;
including a third, fourth and fifth fiber in the second layer oriented in substantially parallel relation to one another and oriented perpendicularly relative to the first and second fibers;
locating the third and fifth fibers immediately adjacent to the fourth fiber on opposite sides thereof;
connecting the first fiber to each one of the third and fifth fibers at connection sites at an approximate location of a shortest distance between the first fiber and respective ones of the third and fifth fibers; and
connecting the second fiber to the fourth fiber at at least one connection site at an approximate location of a shortest distance between the second fiber and fourth fibers.

20. The method of claim 19 further comprising the step of:
connecting the second fiber to the third and fifth fibers at the location of the connection sites where the first fiber is connected to the third and fifth fibers.

21. The method of claim 14 further comprising the step of:
connecting the first fiber to the second fiber at a plurality of the connection sites.

22. The method of claim 14 wherein the step of connecting the first and second fibers at the connection site comprises at least one of the following:
adhesively bonding the first and second fibers at the connection site;
thermoplastically fusing the first and second fibers at the connection site;
mechanically pinning the first and second fibers at the connection site.

23. The method of claim 14 wherein the connection between the first and second fibers at the connection site comprises at least one of the following:
a connection failure strain that differs from the failure strain of the matrix by at least 25 percent;
a connection strength that differs from the tensile strength of the matrix by at least 25 percent.

* * * * *